May 7, 1968     H. G. CONNER ET AL     3,382,368
UNDULATION COUNTING APPARATUS
Filed Oct. 5, 1964     3 Sheets-Sheet 1
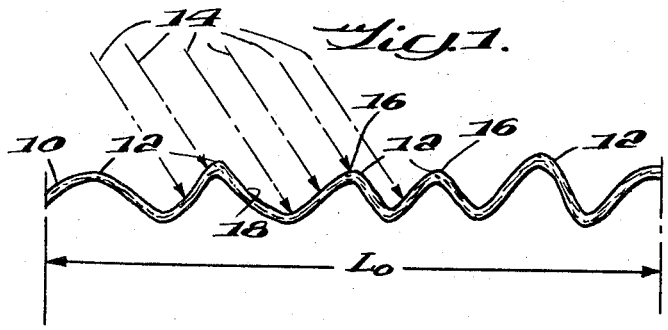
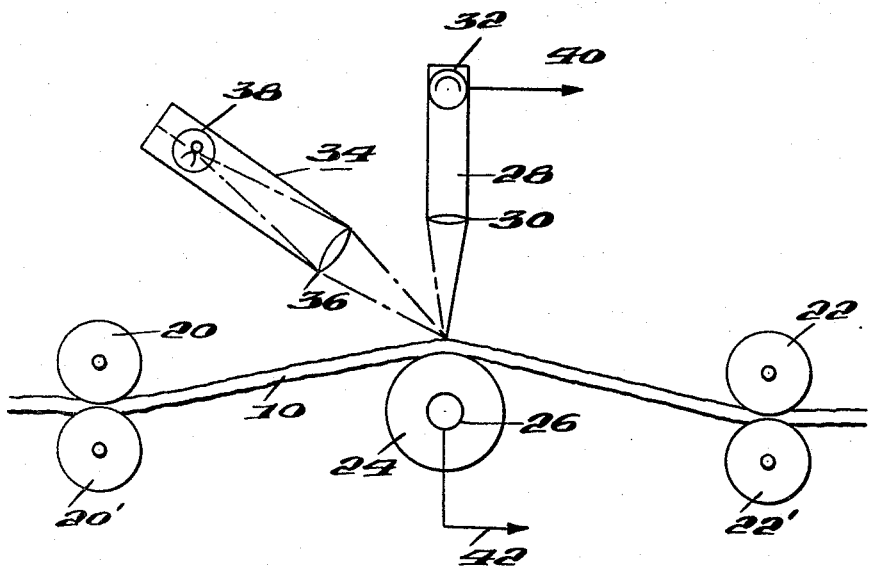
INVENTORS,
HARRY GORSUCH CONNER,
JACK ARNET HANCOCK,
EDWARD WILLIAM YETTER,
BY Gordon R. Coons
AGENT May 7, 1968   H. G. CONNER ET AL   3,382,368
UNDULATION COUNTING APPARATUS
Filed Oct. 5, 1964   3 Sheets-Sheet 2
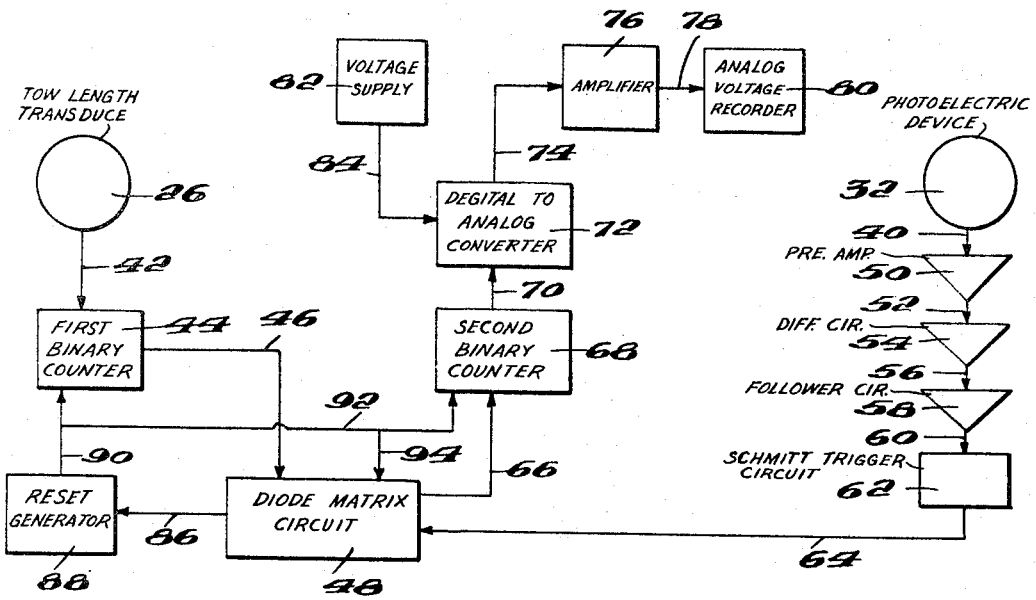
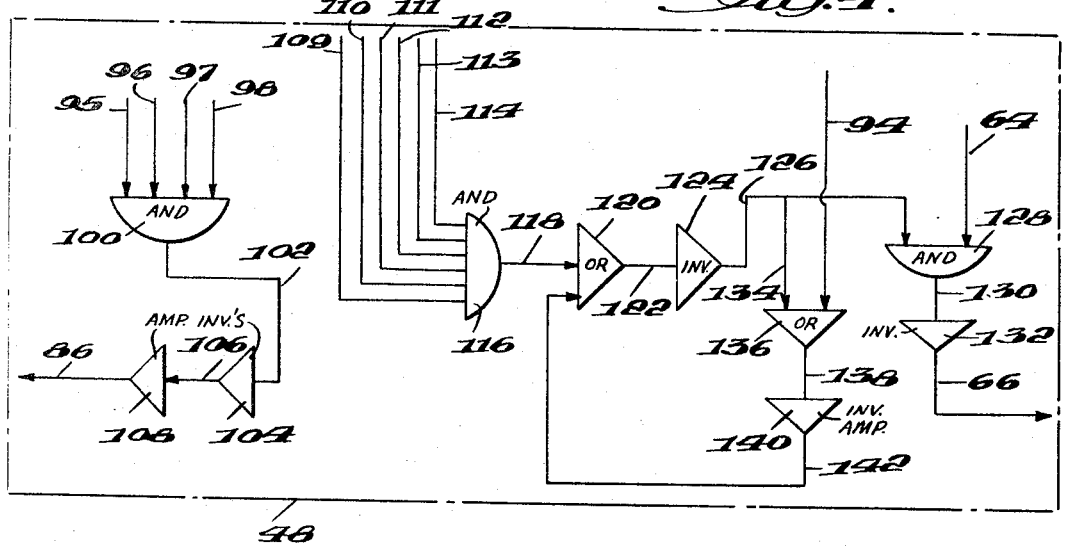
INVENTORS
HARRY GORSUCH CONNER,
JACK ARNET HANCOCK,
EDWARD WILLIAM YETTER,
BY  Gordon R. Coons
AGENT

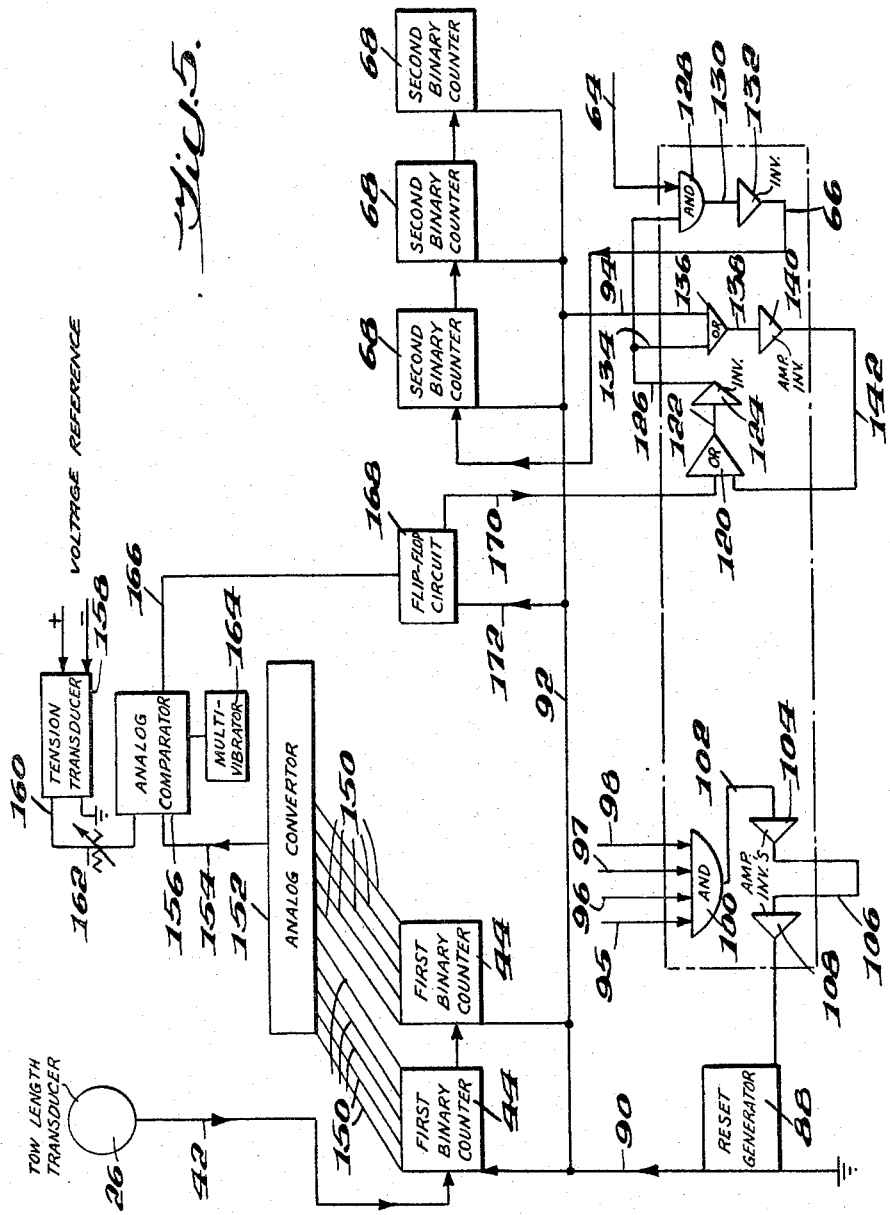

United States Patent Office 3,382,368
Patented May 7, 1968

3,382,368
UNDULATION COUNTING APPARATUS
Harry Gorsuch Conner, Kennett Square, Pa., Jack Arnet Hancock, Nashville, Tenn., and Edward William Yetter, West Chester, Pa., assignors to E. I. du Pont de Nemours and Company, Wilmington, Del., a corporation of Delaware
Filed Oct. 5, 1964, Ser. No. 401,511
5 Claims. (Cl. 250—219)

ABSTRACT OF THE DISCLOSURE

Apparatus to count crimp frequency of a moving textile tow comprising: a light source illuminating a small spot on the tow at a critical angle; a photoelectric detector receiving light pulses scattered from the spot and generating signals determined by crimps passing per unit time; a speed transducer generating signals determined by tow speed; a tension transducer generating signals determined by tow tension; and electronic computing and display circuitry for analyzing the signals and producing a read-out of crimps per unit tow length at a preselected tension.

---

This invention relates to the processing of textile rope or tow and more specifically to apparatus for the measurement of crimps per unit length in rope or tow which has been crimped by conventional means such as a stuffer box. Textile rope or tow hereinafter called tow, is defined as an assemblage of a large number of continuous multifilament yarns in substantially parallel association having a total weight per unit length of up to several hundred thousand denier.

Knowledge and control of crimp level in textile tow are important not only in connection with properties such as bulk of end products manufactured from the tow but also are important in connection with processing performance of the tow during its conversion into the end product such as spinning of yarn from staple fibers cut from the tow. In the past, crimp level has been evaluated primarily by removing a sample section of the crimped tow from the main stream, visually counting the number of crimps in a known length of either a single filament or bundle under standard known tension and computing the count of the crimps or undulations per unit of length of sample. Another indirect method has been to measure the extent of bulking by volumetric techniques. These methods of crimp evaluation have provided some valuable information about the fiber processing characteristics and acceptability of the crimp level but have been excessively time consuming, expensive, and a cause of frequent production losses because of the time lag between crimp level measurement and corrective action.

An object of this invention is to provide a method and means for the accurate measurement of crimps per unit length in a textile tow. Another object is to provide a method and means for the rapid read out of crimp frequency to enable early corrective adjustment of process and consequent reduction of off-standard production. Other objects will appear hereinafter.

The objects of this invention are accomplished, in general, by apparatus which comprises light source means to selectively illuminate undulations in textile tow, means to provide relative motion between illumination from the light source means and the textile tow, means transducing the variations in the light reflected from the selectively illuminated textile tow to a first electrical signal, means transducing the relative motion to a second electrical signal and means determining the ratio between the first electrical signal and the second electrical signal.

In the preferred embodiment, the textile tow is moving and the electrical signals are in the form of pulse trains. The means determining the ratio hereinbefore mentioned comprises a first and second counter means, the first counter means counting a first predetermined number of pulses during a first counting period and a second predetermined number of pulses during a second counting period. Coincidence means are connected to the first counter means and the output circuit of the second pulse train so that the second pulse train passes to the second counter means during the first counting period. Both the first and the second counter means are resettable after the first counter means counts the second predetermined number of pulses. This embodiment allows the number of crimps per unit length to be viewed during the second counting period.

When the tension in the textile tow is to be considered, the apparatus of this invention, in general, comprises light source means to selectively illuminate undulations in the textile tow, means to provide relative motion between illumination from the light source means and the textile tow, means transducing the variations in the light reflected from the selectively illuminated textile tow to a first electrical signal, means transducing the relative motion to a second electrical signal, means generating a third electrical signal related to the tension in the textile tow, means determining the ratio between the first electrical signal and the second electrical signal and means modifying the ratio responsive to the third electrical signal.

The embodiments of this invention and their advantages can be more readily understood by referring to the accompanying drawings.

FIGURE 1 is a simplified longitudinal cross-sectional view of a portion of crimped textile tow illustrating the selective illumination.

FIGURE 2 is a schematic diagram of a light source, photoelectric device, tow drive means, and tow speed transducer;

FIGURE 3 is a block diagram of the electronic components of one embodiment of this invention;

FIGURE 4 is a schematic logic circuit diagram of a diode matrix used to program computations and FIGURE 5 is a block and logic circuit diagram of an embodiment having tension measuring means.

With reference to FIGURE 1, the necessary mathematical considerations in connection with the operation of this invention will be described. A length of crimped tow 10 is shown to have a number of crimps or undulations 12 throughout its length. Assuming that this number of crimps is $n_0$ in a length $L_0$ when the section of tow is in a relaxed or zero tension state, then the number of crimps per inch in a relaxed state would be given by the equation:

$$N_0 = \frac{n_0}{L_0}$$

If this section of tow is observed when the tow is under a tension, T, the section will have a different length, L, and will appear to have a different number of crimps per inch, N, which is given by the equation:

$$N = \frac{n_0}{L}$$

Where, $L = L_0(1 + K_1 K_2 T)$, and $K_1$ and $K_2$ are spring constants of the tow section.

Combining these equations leads to the function:

$$N = \frac{n_0}{L_0}\left(\frac{1}{1 + K_1 K_2 T}\right)$$

If this section of tow is a part of a continuous length of tow moving at some speed, S, then the number of crimps or undulations passing a given point per unit time, and therefore the number of pulses per unit time detected by a photoelectric device as shown in FIGURE 2, will be equal to F and given by the equation:

$$F = SN$$
$$= S\frac{n_o}{L_o}\left(\frac{1}{1+K_1K_2T}\right)$$
$$= SN_o\left(\frac{1}{1+K_1K_2T}\right)$$

then $$N_o = \frac{F}{S}(1+K_1K_2T)$$

In one embodiment of this invention, the tow drive is so arranged, as explained hereinafter, that the tension, T, is maintained substantially constant throughout a measurement. Then the equation for the crimps per inch, $N_o$, becomes:

$$N_o = \frac{K_3F}{S}$$

The measurement of crimps per inch in a running tow is made, therefore, by counting the number of crimps passing a given point per unit length and performing the computation shown in the above equation. This measurement and computation is done by this invention as described hereinafter for the preferred embodiment.

Additionally, FIGURE 1 schematically illustrates the selective illumination of crimped tow 10 by substantially collimated beams of light 14. As can be seen, the illumination is selective in that peaks 16 of undulations 12 receive more light than do valleys 18 of undulations 12.

Turning to FIGURE 2, the measuring apparatus is seen to comprise a first and second set of tow transporting rolls 20, 20′ and 22, 22′, respectively. One roll of each set is driven by a conventional means not shown. Between these two sets of rolls is located a mandrel roll 24 mounted on bearings for free rotation in a conventional manner not shown. On the axis of mandrel roll 24 is mounted a conventional pulse-output tow length transducer 26 (such as a four pulse per revolution transducer). A continuous tow 10 is shown being fed by rolls 20, 20′ over roll 24 and withdrawn by rolls 22, 22′. A light source and focusing assembly 34 comprising an incandescent bulb 38 and a focusing lens 36 is mounted above the tow and arranged to selectively illuminate undulations in the moving tow at a point where the tow passes over mandrel roll 24. A light detector assembly 28, comprising a lens 30 and a photoelectric device 32 (such as any conventional detector capable of operating at least up to 200 kilocycles) is mounted above the selectively illuminated undulations. Lens 30 is preferably positioned in such a manner so as to present at least a 2× magnification of the selectively illuminated undulations in the tow band to photoelectric device 32. The light source and detector assemblies are mounted in a frame, which in turn may be mounted on a conventional traversing support not shown such that the light source and detector assemblies may be scanned across the tow along a line parallel to the surface of the tow. Cables 40 and 42 extend from the photodetector and tow length transducer respectively to the computer and recorder assembly (FIGURE 3).

As shown in FIGURE 3, the mandrel roll tow length transducer 26 is connected (through an optional Schmitt trigger circuit not shown) over cable 42 to first binary counter 44 (two five bit counters), selected assertion outputs of which are connected over cable 46 to a diode matrix circuit 48. Similarly, photoelectric device 32 is connected over cable 40 first to a preamplifier 50, thence over cable 52 to a clipper and differentiator circuit 54 over cable 56 to an emitter-follower circuit 58, over cable 60, to a Schmitt trigger circuit 62 and over cable 64 finally to the diode matrix circuit 48. Diode matrix 48 is connected over cable 66 to a second binary counter 68 (three five bit counters). Selected assertion output lines of second binary counter 68 are passed over cable 70 to a digital to analog converter 72. Conventional inverters are placed in certain lines of cable 70 as required to supply proper driving current requirements. The output of converter 72 is passed over cable 74 through amplifier 76 and over cable 78 to an analog voltage recorder 80. A precise reference voltage is furnished to converter 72 from voltage supply 82 over cable 84. A second output line from diode matrix 48 is connected over cable 86 to a conventional reset generator 88, the output of which is connected over line 90 to the first binary counter 44 and over reset line 92 to the second binary counter 68. Reset line 92 is also connected to the diode matrix assembly 48 over line 94.

As shown in FIGURE 4, matrix 48 contains the following logic circuit. Selected assertion output lines 95 to 98 from first binary counter 44, contained in cable 46, are connected to AND gate 100, the output terminal of which is connected over line 102 through amplifier-inverter 104 over line 106 through a second amplifier inverter 108, and finally over line 86 to the conventional reset generator 88. Other selected assertion output lines 109 to 114 from cable 46 are connected to AND gate 116. The output terminal of gate 116 is connected over line 118 to OR gate 120, the output terminal of which is connected over line 122 through inverter 124, over line 126 to a third AND gate 128. The second input terminal of gate 128 is connected to cable 64. The output terminal of gate 128 is connected over line 130 through inverter 132 and out over line 66 to counter 68. A line 134 is connected from line 126 to OR gate 136, the output terminal of which is connected over line 138 through inverter-amplifier 140 and over line 142 to the second input terminal of OR gate 120. The second input connection to OR gate 136 is made over line 94 from reset line 92.

With respect to FIGURE 5, there is shown an embodiment which will perform the more complicated computation of the equation:

$$N_o = F/S\ (1+K_1K_2T)$$

This is accomplished, in general, by the addition of a tension transducer and analog comparator into the circuit. Mandrel roll tow length transducer 26 is connected (through an optional Schmitt trigger circuit not shown) over cable 42 to first binary counter 44, the assertion outputs of which are connected over lines 150 to a conventional digital to analog converter 152. The analog output of digital to analog converter 152 is connected over line 154 to a conventional analog comparator 156. Tension transducer 158, which can be conveniently placed adjacent tow 10, is connected over line 160, through conventional gain control 162 and forms the other input to analog comparator 156. Conventional multi-vibrator 164 is connected to analog comparator 156. The output of analog comparator 156 is connected over line 166 to a conventional flip-flop circuit 168, which is in turn connected over line 170 to form one input to OR gate 120. Flip-flop circuit 168 is connected to reset generator 88 by means of lines 90, 92 and 172.

In the operation of the embodiment illustrated, the device of this invention generates a first pulse train from light reflected into the photoelectric device 32 from crimp on the surface of moving tow 10 and a second pulse train is obtained from the tow length transducer 26 to indicate the length of sample taken. The number of crimps per unit length of tow is computed by means of binary counters and computer logic circuitry. For convenience, the results of this computation are converted to an analog signal which is presented on a strip chart recorder.

These operations and functions of the various components of the embodiment of this invention which is illustrated are accomplished as follows: A continuous sample of crimped tow 10 (FIGURE 2) is fed from feed rolls 20, 20′ over mandrel roll 24 and withdrawn by take-up rolls 22, 22′. The feed rolls and take-up rolls are maintained each at constant speeds by conventional motor drive means. A difference in the speed between the two sets of rolls is maintained constant with the take-up rolls having a slightly higher speed such that the tension in tow 10 is maintained at a constant value. In this way, the effect of tow tension is reduced to a constant factor in the computation of crimps per inch. Light source and focusing assembly 34 is arranged to project a restricted high intensity collimated beam of light on the upper surface of the tow to selectively illuminate undulations in the tow. The angle of illumination is adjusted for maximum signal strength in the photoelectric device 32. In this embodiment the light source assembly 34 is located in a vertical plane parallel to the tow direction of motion and arranged to give approximately a 60° incidence angle of illumination. The light detector assembly 28 is located in a vertical plane perpendicular to the tow direction of motion and aimed at the selectively illuminated undulations at approximately a 30° angle from horizontal. As the tow moves under the selectively illuminated undulations, light of varying intensity is reflected from the crimped or undulated surface of the tow into the photodetector from which is generated an electrical pulse output for each crimp passed under the light. This arrangement of the optical system was developed to attain optimum contrast and resolution required to gain adequate signal to noise ratio prior to electronic amplification. In order to obtain an average value over the width of the tow, the light source assembly 34 and light detector assembly 28 are mounted in a frame which is traversed in a plane perpendicular to tow motion such that the light spot and detector scan the width of the moving tow.

Electronically the pulse signals from photoelectric device 32 (FIGURE 2) are first amplified by a solid state preamplifier 50 (FIGURE 3). Then the signal to noise ratio is enhanced and the shape of the pulse is modified for optimum operation of second binary counter 68 by means of the clipper and differentiator circuit 54, emitter-follower circuit 58 and finally by the Schmitt trigger circuit 62. These shaped and amplified pulses are fed to AND gate 128 of diode matrix 48 (FIGURE 4). Gate 128 is held open by signals over line 126 as described below for a predetermined number of pulses (corresponding to a certain length of tow) so that pulse signals arriving over line 64 are transmitted through inverter 132 and over line 66 to be counted by second binary counter 68 and then converted in D/A converter 72 to an analog signal which is amplified by amplifier 76 and recorded by analog voltage recorder 80. Pulses from tow length transducer 26, located on mandrel roll 24, are transmitted (optionally through a Schmitt trigger circuti similar to circuit 62) to first binary counter 44. Preselected assertion output lines from first binary counter 44 are connected to AND gate 100. These lines were selected such that gate 100 remains closed up to a first predetermined number of pulses and open when a second predetermined number of pulses is reached. Thus the output signal from gate 100 furnishes the necessary signal to actuate conventional reset generator 88 after the second predetermined number of pulses has been reached. Other preselected assertion outputs from first binary counter 44 are connected to AND gate 116. These are selected to maintain AND gate 116 open up to the first predetermined number of pulses. Output of AND gate 116 is transmitted over line 118 to OR gate 120 and thence through inverter 124 and over line 126 to AND gate 128. This gate allows pulses originating in the photoelectric device and received over line 64 to be passed over line 130 through inverter 132 and over line 66 to second binary counter 68. Thus these pulses are counted for a specified length of tow determined by the first predetermined number of pulses on first binary counter 44. At the end of the period of counting under control from tow length transducer 26, a count is registered in second binary counter 68 which is, in effect, the result of a computation following the equation developed hereinbefore, namely:

$$N_o = \frac{K_3 F}{S}$$

For convenience in interpreting the results, the assertion outputs of second binary counter 68 are passed through digital to analog converter 72, the output of which is then amplified in conventional amplifier 76 and passed to analog voltage recorder 80 to give a display of the number of crimps per running inch in the tow sample 10. The remaining logic in the diode matrix assembly 48 is arranged to provide a hold circuit such that the final count registered in second binary counter 68 is displayed while first binary counter 44 is counting the second predetermined number of pulses. First and second binary counters 44 and 68 are then reset after this period and the measuring and computing process is repeated.

When the tension is also being considered as shown in FIGURE 5, the operation is somewhat different. The essential function of the tension compensation circuitry is to electronically cause the length of tow sampled to be increased or decreased according to the tension level in the tow band. The output of tension transducer 158 passing through gain control 162 provides one analog input to analog comparator 156. Gain control 162 is preset at any convenient level which corresponds to the first counting period for "normal tension." The other input to analog comparator 156 is the assertion output of first binary counter 44, which must count a predetermined number of pulses before the analog input will equal that established by gain control 162. When the two inputs are equal, analog comparator 156 sets flip-flop 168, causing no signal to emit from AND gate 128. Multi-vibrator 164 periodically causes the two inputs to be compared to ascertain if they have reached equality. So, during the first counting period, the pulses from photoelectric device 32 over line 64 are gated through AND gate 128 and are counted in second binary counter 68. As hereinbefore explained, the second counting period (display) and, of course, the total period before reset, is governed by the predetermined assertion outputs of first binary counter 44 which are connected to AND gate 100. When the tension increases above the "normal," the input to analog comparator 156 from tension transducer 158 increases which automatically requires first binary counter 44 to count a larger number of pulses from tow length transducer 26 before equality of the inputs is reached. This, of course, means that the tow length sample has been increased due to the increase in tension. It should be also noted that the second counting period (used for display) becomes correspondingly smaller since the total period is still controlled by the selected assertion outputs of first binary counter 44 which gate a signal through AND gate 100 to reset and renew the cycle after the predetermined number of pulses have been counted. Additionally, it should be obvious that a decrease in the tension will cause a corresponding decrease in the first counting period and therefore, in the tow sample length counted.

The embodiment illustrated utilizes a moving textile tow to provide the relative motion between the illumination from the light source and the textile tow. However, it should be obvious that the light source could scan along a stationary textile tow to provide the relative motion. Additionally, both the light source and the textile tow could be stationary and the relative motion could be provided by utilizing an optical system, such as a combination of revolving mirrors.

Similarly, although it is preferred to utilize a collimated beam of electro-magnetic radiation in the visible range to selectively illuminate undulations in the textile tow, any form of energy can be advantageously employed. The energy need not be limited to radiant energy but could also include a system using pneumatic energy.

Additionally, the determination of the ratio between the first signal (representing crimps) and the signal (relating to length) does not have to be accomplished by binary counters but can be done by any conventional means. For example, the system could be completely analog. When the tension is also being considered, it should be apparent that the ratio can be modified by means other than varying the signal related to length responsive to a change in tension. For instance, the signal related to tension could modify the first ratio which is ascertained.

With respect to the lateral area of the tow which is illuminated, it should be obvious that for selective illumination the lateral area should at least approximate the physical dimensions of a crimp period (i.e., the distance between adjacent peaks 16 of undulations 12, illustrated in FIGURE 1). When energy other than radiant energy is being used, the lateral area should approximate the physical dimensions of a crimp period. However, when radiant energy is being used, the lateral area can, of course, be as large as is desired, provided it is at least as large as the physical dimensions of a crimp period.

It should be readily understood that the positioning of the light source assembly and the photoelectric device may be varied from that shown in the preferred embodiment hereinbefore, the basic requirement being that the light reflected from the tow must be of varying intensity. Similarly, any conventional light source may be utilized as long as the before-mentioned basic requirement is met. The lens which presents the image to the photoelectric device is preferred to be positioned so that at least a 2× magnification of the actual image results. However, the lens may be positioned to present a greater or lesser magnification depending upon the anticipated number of crimps per unit length.

With respect to the tow length transducer, this may be placed at any convenient location. For example, the placement might be advantageously located adjacent the second set of transporting rolls. Also, depending upon the accuracy desired, the tow length transducer may be of any type which will generate a suitable number of pulses per revolution.

Referring to the first binary counter, it should be obvious that the tow length counted (first counting period) and the display period (second counting period) may be modified as desired by selecting different assertion outputs of the two five bit binary counters.

It is apparent that many changes and modifications may be made without departing from the spirit of this invention which is therefore intended to be limited only by the scope of the following appended claims.

What is claimed is:

1. Apparatus for the measurement of crimps per unit length of a textile tow having undulations which comprises light source means to selectively illuminate undulations in said textile tow, means to provide relative motion between illumination from said light source means and said textile tow, means transducing the variations in the light reflected from said selectively illuminated textile tow to a first electrical signal, means transducing said relative motion to a second electrical signal, means generating a third electrical signal related to tension in said textile tow, means determining the ratio between said first electrical signal and said second electrical signal and means modifying said ratio responsive to said third electrical signal.

2. Apparatus for the measurement of crimps per unit length of a textile tow having undulations which comprises light source means to selectively illuminate undulations in said textile tow, means to provide relative motion between illumination from said light source means and said textile tow, means transducing the variations in the light reflected from said selectively illuminated textile tow to a first pulse train, means transducing said relative motion to a second pulse train, means generating a third electrical signal related to tension in said textile tow, means determining the ratio between the repetition rates of said first pulse train and said second pulse train and means modifying said ratio responsive to said third electrical signal.

3. Apparatus for the measurement of crimps per unit length of a moving textile tow having undulations which comprises light source means to selectively illuminate undulations in said moving textile tow, means transducing the variations in the light reflected from said selectively illuminated moving textile tow to a first electrical signal, means deriving a second electrical signal proportional to a tow sample length, means generating a third electrical signal related to tension in said moving textile tow, means determining the ratio between said first electrical signal and said second electrical signal and means modifying said ratio responsive to said third electrical signal.

4. Apparatus for the measurement of crimps per unit length of a moving textile tow having undulations which comprises light source means to selectively illuminate undulations in said moving textile tow, means transducing the variations in the light reflected from said selectively illuminated moving textile tow to a first pulse train, means deriving a second pulse train proportional to a tow sample length, means generating an electrical signal related to tension in said moving textile tow, means determining the ratio between the repetition rates of said first pulse train and said second pulse train and means modifying said ratio responsive to said electrical signal.

5. Apparatus for the measurement of crimps per unit length of a moving textile tow having undulations which comprises light source means to selectively illuminate undulations in said moving textile tow, means transducing the variations in the light reflected from said selectively illuminated moving textile tow to a first pulse train, means deriving a second pulse train proportional to a tow sample length, means generating an electrical signal related to tension, means modifying the output of said second pulse train responsive to said electrical signal and means determining the ratio between said first pulse train and said modified second pulse train.

References Cited

UNITED STATES PATENTS

| | | | |
|---|---|---|---|
| 2,991,685 | 7/1961 | Van Dongeren | 88—14 |
| 3,030,853 | 4/1962 | Strother | 88—14 |
| 3,058,004 | 10/1962 | Domizi et al. | 250—219 |

RALPH G. NILSON, *Primary Examiner.*

M. ABRAMSON, *Assistant Examiner.*